Aug. 7, 1956      J. T. ADELS      2,757,596
ADJUSTABLE BEAM CONNECTION FOR ROLLING DISK COULTER
Filed Jan. 15, 1954
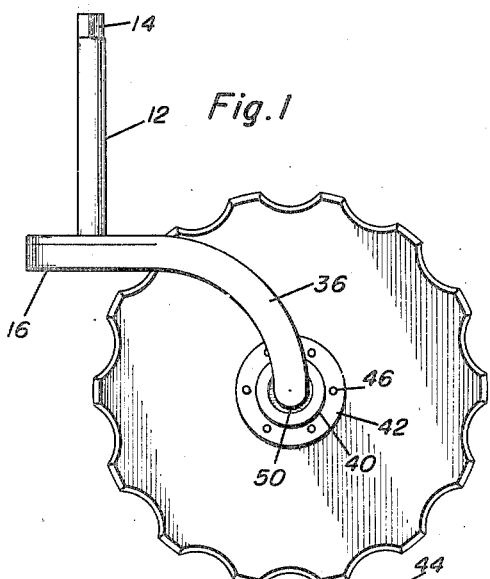
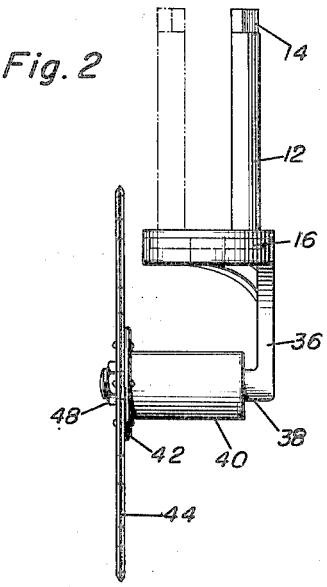
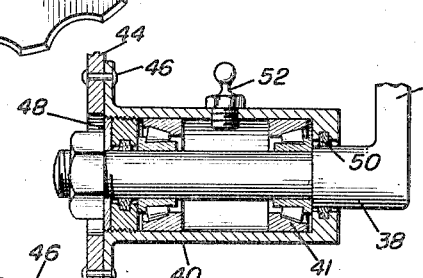
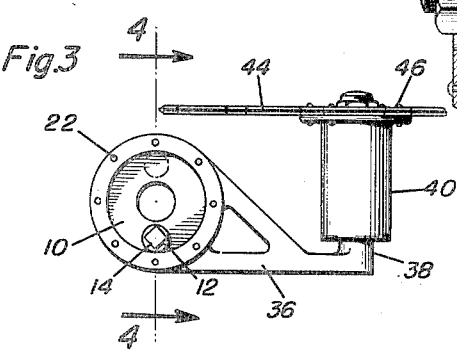
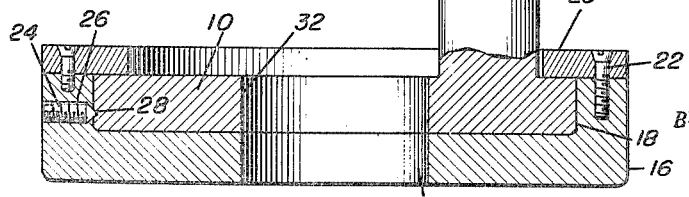
John T. Adels
INVENTOR.

United States Patent Office 2,757,596
Patented Aug. 7, 1956

2,757,596

ADJUSTABLE BEAM CONNECTION FOR ROLLING DISK COULTER

John T. Adels, Kimball, Nebr.

Application January 15, 1954, Serial No. 404,265

2 Claims. (Cl. 97—198.1)

This invention relates to a rolling coulter and particularly to an adjustable mount for a coulter disk so that the disc on its mount will be substantially trash free in operation.

In plowing operations it is customary to mount a coulter ahead of the plow point and mold board so that the sod, trash or other material will be removed from the edge of the land being turned so that the furrow will turn clean without trash or other material showing at the edge thereof and so that the trash will not foul the plow during the plowing operation. It is customary to provide the coulter in the form of a disc which may be journaled on a suitable rigid support and may be angularly related with respect to the plow shank so that the coulter may be adjusted to any desired position. Heretofore considerable difficulty has been encountered because of the accumulation of trash on the coulter and its support.

The present invention provides a rolling coulter having an improved mount so that trash encountered during the operation will not be snagged thereon and encumber the operation of the coulter.

In the construction, according to the present invention, a vertically disposed shank is provided with a mounting disc and a bracket which has a cup receiving the disc and a retainer ring retaining the bracket on the disc so that the entire structure may be rotated and adjusted as it may be desired, after which the bracket and disc may be securely locked together by any suitable means such as a setscrew interposed between the bracket and the disc. The disc is then provided with a rearwardly and downwardly curved arm so that the entire bracket and the shank therefor is mounted well above the surface of the ground and out of the range of the trash thereon. The downwardly curved arm is provided with a laterally extending axle on which a hub is mounted by means of a packed bearing either of the ball-bearing or roller bearing type and the entire hub will be sealed against the entrance of dirt or trash. The coulter blade will be mounted on the hub by any suitable means such as riveting, welding, bolting or the like.

Accordingly an object of the invention is to provide an improved rolling coulter.

A further object of the invention is to provide a substantially trash-free rolling coulter.

A still further object of the invention is to provide a rolling coulter having a pack seal bearing thereon.

Other objects and many of the attendant advantages of the present invention will be apparent from the following detailed description taken in conjunction with the accompanying drawing in which:

Figure 1 represents a side elevation of a rolling coulter according to the invention;

Figure 2 presents a front elevation of the rolling coulter;

Figure 3 presents a top plan view of the rolling coulter;

Figure 4 is an enlarged cross section through the adjustable mounting taken substantially on the plane indicated by the section line 4—4 of Figure 3;

Figure 5 is a perspective view of the shank and mounting plate of the coulter; and Figure 6 is an enlarged sectional view of the sealed hub.

In the exemplary embodiment according to the invention, a mounting disc 10 has a shank 12 rigidly connected thereto in off-set relation to the center thereof. The shank 12 will be mounted to the plow beam in any desired manner preferably by suitable clamp means so that the shank 12 may be turned by means of a square top 14 to any desired relation. A mounting bracket 16 is adapted to receive the mounting plate 10 and for this purpose is provided with a recess 18 which is preferably cup-like in formation and slidably and rotatably receives the disc 10. A retaining ring 20 is mounted on the edge of the cup-like recess in the bracket 16 by any suitable means such as screws 22 and preferably overlies a portion of the disc 10 so that the disc 10 is retained in the cup-like recess 18 and the bracket 16 is rotatably mounted on the disc 10.

In order to lock the bracket 16 with respect to the disc 10, a locking device such as a setscrew 24 is threadedly mounted in an aperture 26 in the side of the bracket 16 and the point 28 of the setscrew will make contact with the side of the disc 10 so that the bracket and disc may be readily locked in any desired relation. The disc 10 and the bracket 16 are provided with apertures 32 and 34 in aligned coaxial relation so that any dirt or trash falling on the top of the adjusting means may readily fall through the apertures 32 and 34 and thus prevent dirt from working in between the surfaces of the disc 10 and the bracket 16.

A laterally extending downwardly curved arm 36 is rigidly affixed to and preferably integral with the bracket 16 and preferably extends downwardly a distance of approximately four to six inches so that the bracket 16 will be elevated a material distance above the major portion of the bracket. Laterally extending axle 38 is mounted on and preferably integral with the arm 36 adjacent the lower end thereof.

A hub 40 is journaled on the axle 38 by means of a suitable anti-friction bearing 41. The anti-friction bearing 41 is preferably of the packed type so that the hub 40 may be sealed against the ingress of dirt or other foreign material whereby the bearing 41 will be substantially immune from the ordinary wear and tear of the plowing operations and may be packed occasionally as may be desired. Preferably the hub 40 is provided with a flange 42 on which is mounted a coulter blade 44 by any suitable means such as the rivets 46.

The outer end of the hub 40 is preferably sealed by means of a cap 48 while the inner end may be sealed by means of a suitable seal 50 in order to prevent the loss of grease from the bearing and the ingress of dirt or foreign material during the operation of the device.

In the operation of the device, the bearing 41 and the hub 40 will be packed with grease and the seal cap 48 applied so that the device may be operated throughout a season without the necessity of re-packing. Make up grease may be applied through the fitting 52 without the necessity of disassembling the hub and bearing. The shank 12 will be mounted on the plow in any suitable manner and the setscrew 24 will be released so that the shank 12 may be rotated and the bracket 16 may be rotated on the disc 10 to adjust the disc 44 in any desired relation with respect to the furrow to be cut, after which the adjustment will be locked by tightening the setscrew 24.

Because of the downwardly curved construction of the arm 36, the adjusting bracket 16 and the mounting plate 10 are mounted a material distance above the center of the coulter so that the adjusting bracket will not be clogged or otherwise damaged by an accumulation of trash thereon.

For purposes of exemplification, a particular embodiment of the invention has been shown, and described according to the best present understanding thereof. However, it will be apparent to those skilled in the art that various changes and modifications may be made therein without departing from the true spirit and scope of the invention.

What is claimed as new is as follows:

1. A rolling coulter comprising an annular horizontal mounting plate, a shank fixed on said plate, a bracket having a recess receiving said plate, a retainer ring attached to said bracket and overlying the edge of said annular mounting plate, a laterally extending, downwardly curved arm on said bracket, a laterally extending axle fixed on said arm, a hub journaled on said axle, a coulter disk mounted on said hub, said bracket having a vertical aperture communicating with the center of said annular plate.

2. A rolling coulter comprising a circular horizontal mounting plate, a shank fixed on said plate in off-set relation to the axis of the plate, a bracket having a cup-like recess receiving said mounting plate, a retainer ring secured to the bracket adjacent to said recess and overlying the edge of said mounting plate, coaxial apertures through said mounting plate and said bracket, a setscrew mounted in said bracket and adapted to engage said mounting plate, a downwardly curved arm on said bracket, an axle fixed on said arm, a hub rotatably mounted on said axle, a sealed packed bearing interposed between said axle and said hub, and a coulter disk mounted on said hub.

References Cited in the file of this patent

UNITED STATES PATENTS

| | | |
|---|---|---|
| 616,450 | Bransford | Dec. 27, 1898 |
| 939,716 | Kuster et al. | Nov. 9, 1909 |
| 1,225,949 | French | May 15, 1917 |
| 1,592,304 | Keyes | July 13, 1926 |
| 2,108,351 | Silver | Feb. 15, 1938 |
| 2,393,203 | Tarbell et al. | Jan. 15, 1946 |
| 2,494,639 | Yates | Jan. 17, 1950 |